United States Patent
Chapagain et al.

(10) Patent No.: US 12,281,704 B2
(45) Date of Patent: Apr. 22, 2025

(54) SEAL MEMBER FOR JOINT ASSEMBLY OF A MACHINE AND SYSTEMS, METHODS, AND ASSEMBLIES THEREOF

(71) Applicant: Caterpillar Inc., Peoria, IL (US)

(72) Inventors: Pradeep Chapagain, Dunlap, IL (US); Joel K. Cadbury-Allen, Newcastle upon Tyne (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/096,584

(22) Filed: Jan. 13, 2023

(65) Prior Publication Data

US 2024/0240716 A1 Jul. 18, 2024

(51) Int. Cl.
  *F16J 15/32* (2016.01)
  *F16J 15/3268* (2016.01)
  *F16J 15/3284* (2016.01)

(52) U.S. Cl.
  CPC ....... *F16J 15/3268* (2013.01); *F16J 15/3284* (2013.01)

(58) Field of Classification Search
  CPC ...... F16J 15/3268; F16J 15/3284; F16J 15/36; F16J 15/04; F16J 15/041; F16J 3/04; F16J 3/041; F16J 3/042
  See application file for complete search history.

(56) References Cited

U.S. PATENT DOCUMENTS

| | | | |
|---|---|---|---|
| 3,391,952 A * | 7/1968 | Zeigler | F16C 11/0671 403/126 |
| 3,806,158 A | 4/1974 | Casey | |
| 4,121,844 A * | 10/1978 | Nemoto | F16J 15/52 277/637 |
| 4,553,760 A | 11/1985 | Reed et al. | |
| 5,033,872 A * | 7/1991 | Ueno | F16C 11/0614 384/209 |
| 5,066,159 A * | 11/1991 | Urbach | F16C 11/0671 403/135 |
| 5,466,084 A * | 11/1995 | Brueggen | F16C 11/0671 403/50 |
| 5,538,275 A * | 7/1996 | Lomnick | B60G 7/005 277/635 |
| 5,931,597 A | 8/1999 | Urbach | |
| 6,325,544 B1 * | 12/2001 | Sasaki | F16C 11/0614 384/209 |

(Continued)

FOREIGN PATENT DOCUMENTS

| | | |
|---|---|---|
| DE | 3512977 A1 | 10/1986 |
| GB | 2077370 A | 12/1981 |

*Primary Examiner* — Eugene G Byrd
*Assistant Examiner* — L. Susmitha Koneru

(57) ABSTRACT

A sealing member, which can have a first end portion and a second end portion opposite the first end portion, can comprise: a body defining a first opening at the first end portion of the sealing member and a second opening at the second end portion of the sealing member; a first ring fitted to the body at the first end portion of the sealing member; and a second ring fitted to the body at the second end portion of the sealing member. A first diameter of the first ring can be less than a second diameter of the second ring. The body can have a flange that extends radially outward, away from a central longitudinal axis of the sealing member, at a second end of the body associated with the second end portion of the sealing member.

20 Claims, 10 Drawing Sheets

(56) References Cited

U.S. PATENT DOCUMENTS

| | | | |
|---|---|---|---|
| 6,349,470 B1* | 2/2002 | Sasaki | F16C 11/0671 |
| | | | 384/208 |
| 7,073,949 B2 | 7/2006 | Ruckle et al. | |
| 7,704,007 B2* | 4/2010 | Elterman | F16D 3/845 |
| | | | 403/50 |
| 9,316,257 B2* | 4/2016 | Harper | F16C 11/0614 |
| 9,790,983 B2* | 10/2017 | Kopsie | F16C 11/0695 |
| 9,829,044 B2* | 11/2017 | Clark | F16C 33/74 |
| 10,288,173 B2 | 5/2019 | Chapagain et al. | |
| 10,288,174 B2 | 5/2019 | Chapagain et al. | |
| 10,294,988 B2 | 5/2019 | Rangan et al. | |
| 10,471,825 B2 | 11/2019 | Roberts et al. | |
| 11,009,064 B2* | 5/2021 | Holmes | F16C 11/0671 |
| 11,466,727 B2* | 10/2022 | Auquier | F16C 11/0642 |
| 2006/0182491 A1* | 8/2006 | Bernhardt | F16J 3/042 |
| | | | 403/134 |
| 2007/0059092 A1* | 3/2007 | Elterman | F16C 11/0671 |
| | | | 403/50 |
| 2012/0248723 A1* | 10/2012 | Harper | F16C 33/723 |
| | | | 384/477 |
| 2014/0016888 A1* | 1/2014 | Harper | F16C 33/74 |
| | | | 384/147 |
| 2018/0149192 A1* | 5/2018 | Hosen | F16J 15/52 |
| 2018/0372148 A1* | 12/2018 | Hirota | F16C 11/0671 |
| 2019/0186633 A1* | 6/2019 | Ma | F16J 15/3268 |
| 2019/0368536 A1* | 12/2019 | Holmes | F16J 3/042 |
| 2021/0301864 A1 | 9/2021 | Person et al. | |
| 2022/0163066 A1 | 5/2022 | Liebe | |

* cited by examiner

SEAL MEMBER FOR JOINT ASSEMBLY OF A MACHINE AND SYSTEMS, METHODS, AND ASSEMBLIES THEREOF

TECHNICAL FIELD

The present disclosure relates generally to a seal member for a joint assembly of a machine and, systems, methods, and assemblies thereof.

BACKGROUND

Machines, such as off-highway machines, can operate in a variety of environments. Such machines can include a chassis having a frame component that is pivotably movable with respect to the chassis which supports one or more ground-engaging devices, such as wheels. The frame component can be pivotably attached to the main chassis by way of a joint assembly having a bearing. Should contaminants, such as mud, infiltrate the bearing, the bearing can become damaged or impaired. For example, should debris accumulate in the bearing, the operation of the bearing can be impaired such that it experiences increased mechanical loads that lead to early failure or damage the bearing.

U.S. Pat. No. 10,288,174 ("the '174 patent") describes a seal member for a joint between a pivot member movable about a rotational axis of a shaft of a machine. The seal member includes a ring, a flange, and a resiliently flexible intermediate portion interposed therebetween. According to the '174 patent, the intermediate portion has a ring end that circumscribes, and is connected to, an outer circumferential ring surface of the ring and a flange end that is connected to the inner flange surface of the flange such that the ring is relatively moveable with respect to the flange.

SUMMARY

According to one or more aspects of the present disclosure, a sealing member having a first end portion and a second end portion opposite the first end portion can be provided or implemented. The sealing member, which may be referred to as a seal or a seal member, can comprise: a semi-flexible body defining a first opening at the first end portion of the sealing member and a second opening at the second end portion of the sealing member; a first ring fitted to the semi-flexible body at the first end portion of the sealing member, the first ring being made of material more rigid than material of the semi-flexible body; and a second ring fitted to the semi-flexible body at the second end portion of the sealing member, the second ring being made of material more rigid than the material of the semi-flexible body. A first diameter of the first ring can be less than a second diameter of the second ring. The semi-flexible body can have a flange that extends radially outward, away from a central longitudinal axis of the sealing member, at a second end of the semi-flexible body associated with the second end portion of the sealing member.

According to one or more aspects of the present disclosure, a method can be implemented. The method can comprise providing a seal having a first end portion to be sealingly coupled to a boss of a joint assembly and a second end portion opposite the first end portion to be sealingly coupled to a pivot of the joint assembly. The seal can include: a rubber body defining a first opening at the first end portion of the seal and a second opening at the second end portion of the seal, a first ring fixed to the rubber body at the first end portion of the seal, the first ring being made of material more rigid than a rubber of the rubber body, and a second ring fixed to the rubber body at the second end portion of the seal, the second ring being made of material more rigid than the rubber of the rubber body. A first width of the first end portion of the seal can be less than a second width of the second end portion of the seal, and/or the rubber body can have a flange extending radially outward, away from a central longitudinal axis of the seal, at a second end of the rubber body associated with the second end portion of the seal.

According to one or more aspects of the present disclosure, a joint assembly for a machine can be provided or implemented. The joint assembly can comprise: a shaft defining a rotational axis; a bearing coupled to the shaft such that the bearing is pivotable about the rotation axis with the shaft; a pivot mounted to the bearing such that the pivot is pivotable about the rotational axis with respect to the shaft; a boss; and a seal having a first end portion sealingly coupled to the boss and a second end portion opposite the first end portion sealingly coupled to the pivot. The seal can include a semi-rigid rubber body defining a first opening at the first end portion of the seal and a second opening at the second end portion of the seal, a first ring mold-fitted to the semi-rigid rubber body at the first end portion of the seal, the second ring being made of steel or nylon, and a second ring mold-fitted to the semi-rigid rubber body at the second end portion of the seal, the second ring being made of steel. A first diameter of the first ring can be less than a second diameter of the second ring and/or the semi-rigid rubber body can have a circumferential flange extending radially outward, away from the shaft, at an end thereof associated with the second end portion of the seal.

DETAILED DESCRIPTION

The present disclosure relates generally to a seal member for a joint assembly of a machine and, systems, methods, and assemblies thereof.

Figure 1:
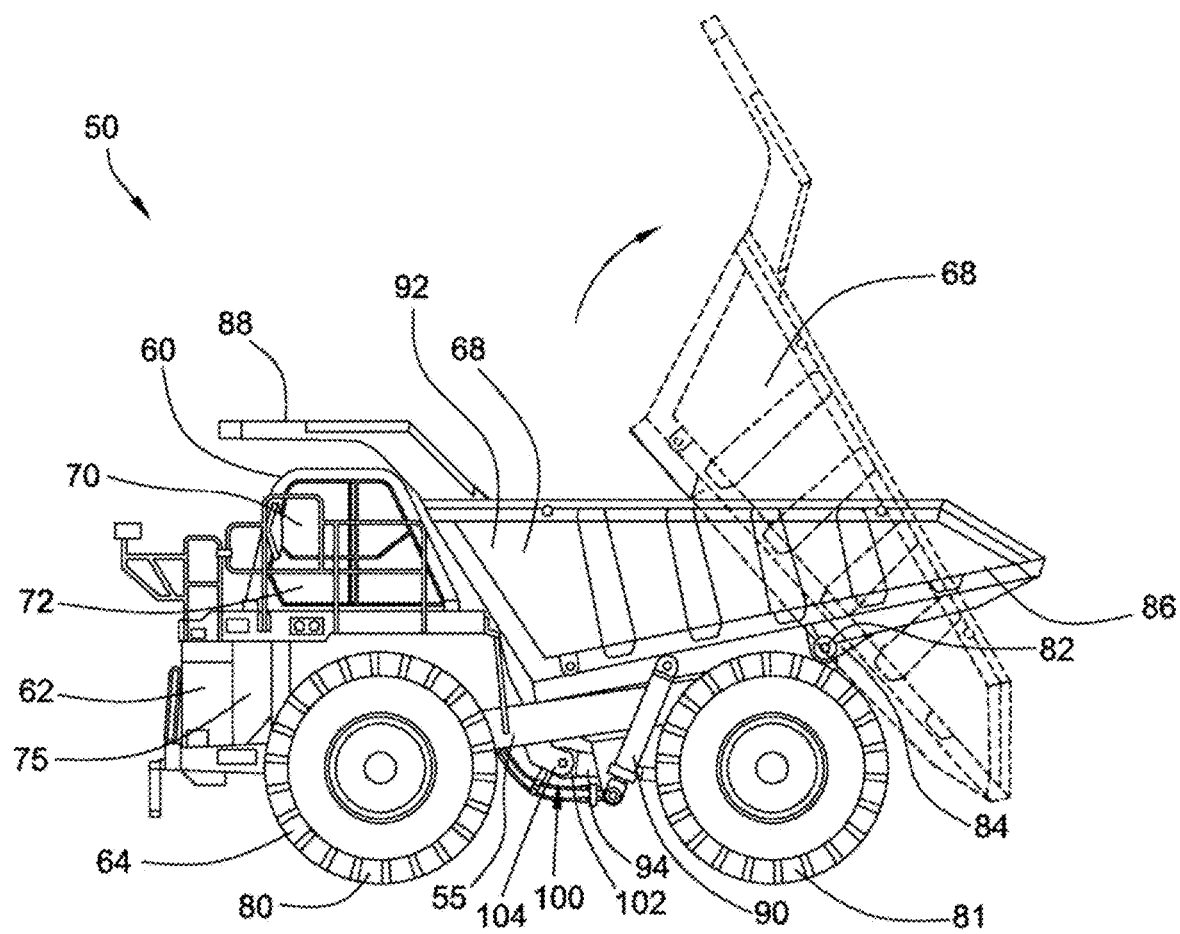
FIG. 1 is a diagrammatic side view of an embodiment of a machine in the form of an off-highway truck suitable for use with an embodiment of a joint assembly having an embodiment of a seal member constructed in accordance with principles of the present disclosure.

Turning now to the figures, FIG. 1 shows an exemplary embodiment of a machine 50 in the form of an off-highway truck. In the illustrated embodiment, the machine 50 is a large self-propelled off-highway vehicle capable of carrying tons of material in operations such as mining and the like. Embodiments of the disclosed subject matter, however, are not limited to the machine 50 in the form of an off-highway truck.

Figure 4:
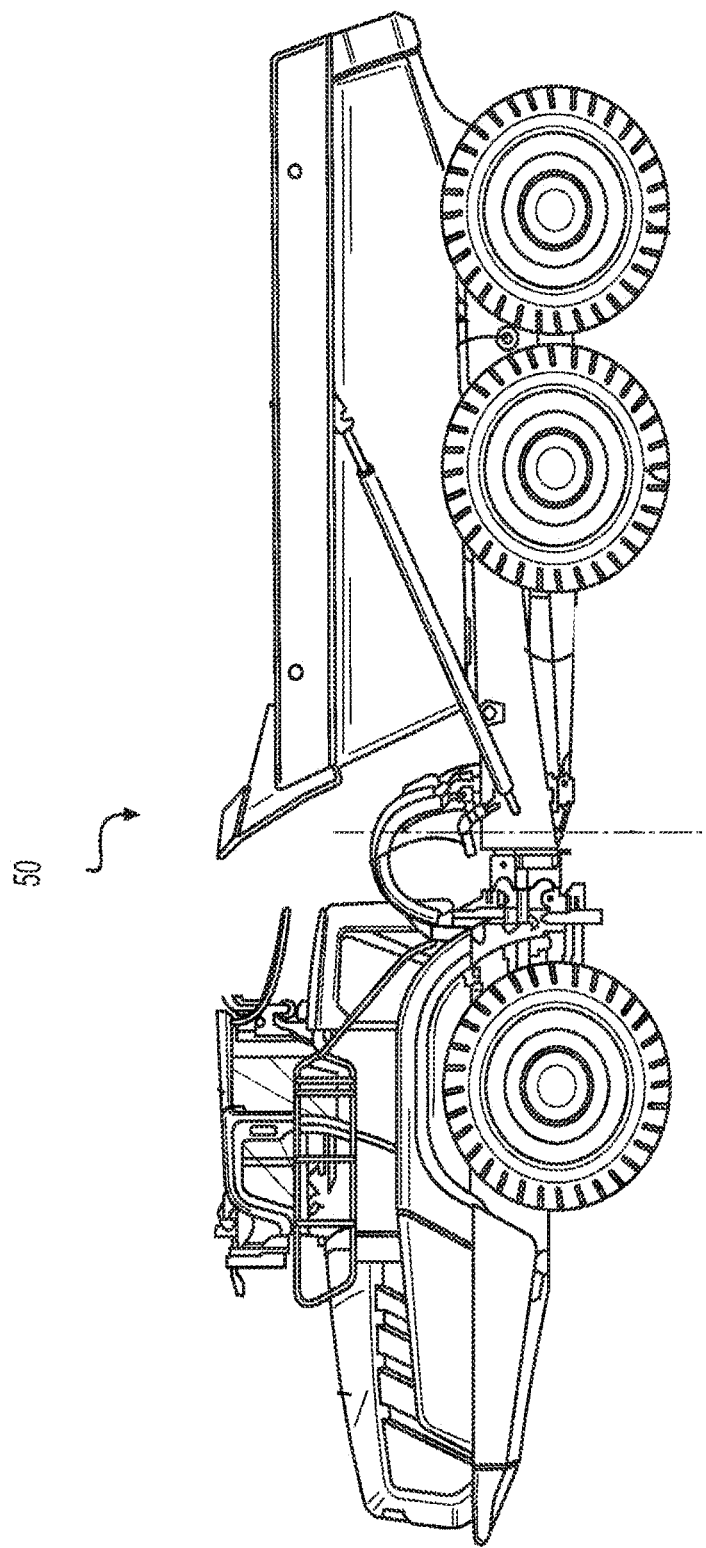
FIG. 4 is a side view of an embodiment of a machine in the form of an articulated dump truck (ADT) according to one or more embodiments of the present disclosure.

For instance, the machine 50 can be any machine having a joint with a spherical bearing linking a front suspension or A-frame to a front chassis. Thus, the machine 50 can be any other suitable machine for use with a joint assembly having a seal member constructed in accordance with principles of the present disclosure. According to one or more embodiments, the seal member may be regarded as a bowl seal, based on the shape of the seal member. Examples of such machines include mobile or fixed machines used for construction, farming, mining, forestry, transportation, and other similar industries. In some embodiments, the machine 50 can be an excavator, wheel loader, backhoe, crane, compactor, dozer, wheel tractor-scraper, material-handling machine, or any other suitable machine which includes a joint assembly with a seal. FIG. 4 is as a specific example of another embodiment of the machine 50. Notably, FIG. 4 shows the machine 50 in the form of an articulated dump truck (ADT), which can have a somewhat different chassis, suspension, and joint layout compared to the off-highway tuck (OHT) of the machine 50 of FIG. 1.

Referring still to FIG. 1, the machine 50 has a chassis 55 which supports an operator station 60, a power system 62, a drive system 64, and a dump body 68. The operator station 60 includes controls for operating the machine 50 via the power system 62. The illustrated operator station 60 is configured to define an interior cabin 70 within which the operator controls are housed and which is accessible via a door 72. Specifically, the operator station 60 can include one or more operator interface devices configured for use by a machine operator to maneuver the machine 50 and perform tasks with the machine 50, for example. Examples of operator interface devices include, but are not limited to, a joystick, a steering wheel, and/or a pedal as are well known and understood in the industry. Of course, the machine 50 may be autonomous or remotely controlled, so the operator station 60 may be merely a legacy component when no operator is onboard or may be omitted.

The power system 62 is configured to supply power to the machine 50. The power system 62 is operably arranged with the operator station 60 to receive control signals from the controls in the operator station 60 and with the drive system 64 and the dump body 68 to selectively operate the drive system 64 and the dump body 68 according to control signals received from the operator station 60. The power system 62 is adapted to provide operating power for the propulsion of the drive system 64 and the operation of the dump body 68 as is understood by those having ordinary skill in the art. In the case of remote control of the machine 50, the power system 62 may receive wireless control signals from offboard the machine 50.

In embodiments, the power system 62 can include an engine, a cooling system or package, a transmission, and a hydraulic system, for example, housed at least in part within an engine compartment 75 supported by the chassis 55. In embodiments, the engine can be any suitable engine, such as, an internal combustion engine, a diesel engine, a gasoline engine, a gaseous fuel-powered engine or any other type of suitable engine. In embodiments, the power system 62 can include a number of engines. The cooling system can be configured to cool the engine(s) of the power system 62.

The hydraulic system can include a plurality of components such as pumps, valves, and conduits, along with a hydraulic fluid reservoir. The hydraulic system, as well as other systems in the machine 50, may include its own cooling arrangement.

The dump body 68 defines a storage compartment configured to carry a payload, such as mined material, for example. The dump body 68 is pivotably attached to the chassis 55 by a pair of pivot pins 82 respectively extending through a pair of body supports 84 projecting form the dump body 68 and located toward a rear end 86 of the dump body 68, one on each side of the dump body 68. The pivot pins 82 define a dump body pivot axis about which the dump body 68 can rotate relative to the chassis 55. The dump body 68 is movable over a range of travel between a storage position (shown in FIG. 1) and a fully-inclined dumping position (shown in dashed lines in FIG. 1).

The dump body 68 includes a canopy 88 that extends outwardly from the dump body 68 when the dump body 68 is in the storage position, as shown in FIG. 1. When the dump body 68 is in the storage position, the canopy 88 extends over the operator station 60 and is configured to protect the operator station from debris falling overhead during loading of the dump body 68. In other embodiments, a different style of dump body 68 can be used. In embodiments, the dump body 68 can include a tailgate at the rear end 86 thereof which is adapted to move between an open position and a closed position.

In embodiments, at least one actuator 90 is provided that is adapted to selectively move the dump body over the range of travel between the storage position and the fully-inclined dumping position. In embodiments, the actuator 90 can be any suitable actuator, such as an extendable cylinder in the form of a hydraulic cylinder or a hydro-pneumatic cylinder, for example, as is well known to those skilled in the art. In embodiments, the machine 50 can include a single extendable cylinder, for example, a pair of extendable cylinders as is customary, or more than two cylinders to selectively pivot the dump body 68.

In the illustrated embodiment, a pair of actuators in the form of extendable cylinders 90 is provided. Each of the extendable cylinders 90 is pivotably connected to a respective side of the chassis 55 and the dump body 68. Each extendable cylinder 90 is moveable over a range of travel between a retracted position (as shown in FIG. 1) and an extended position to place the dump body 68 in the storage position and the fully-inclined position, respectively.

In the illustrated embodiment, when the cylinders 90 are in the retracted position, the dump body 68 is in the storage position for receiving payload therein. When the cylinders 90 are in the extended position, a front end 92 of the dump body 68 is raised relative to the chassis 55 to pivot the dump body 68 about the pivot axis to one of a series of dumping positions up to the fully-inclined dumping position for expelling the payload stored within the dump body 68 from the rear end 86 thereof. This movement of the dump body 68 can be controlled using an operator interface device housed in the operator station 60 and/or external to the operator station 60, for instance, offboard the machine 50.

The drive system 64 is in operable arrangement with the power system 62 to selectively propel the machine 50 via control signals sent through the operator station 60 and/or external to the operator station 60, for instance, offboard the machine 50. The drive system 64 can include a plurality of ground-engaging members, such as, front and rear wheels 80, 81 as shown in the illustrated embodiment. In embodiments, the drive system 64 can be provided in the form of a track-drive system, a wheel-drive system, or any other type of drive system configured to propel the machine 50.

Figure 2:
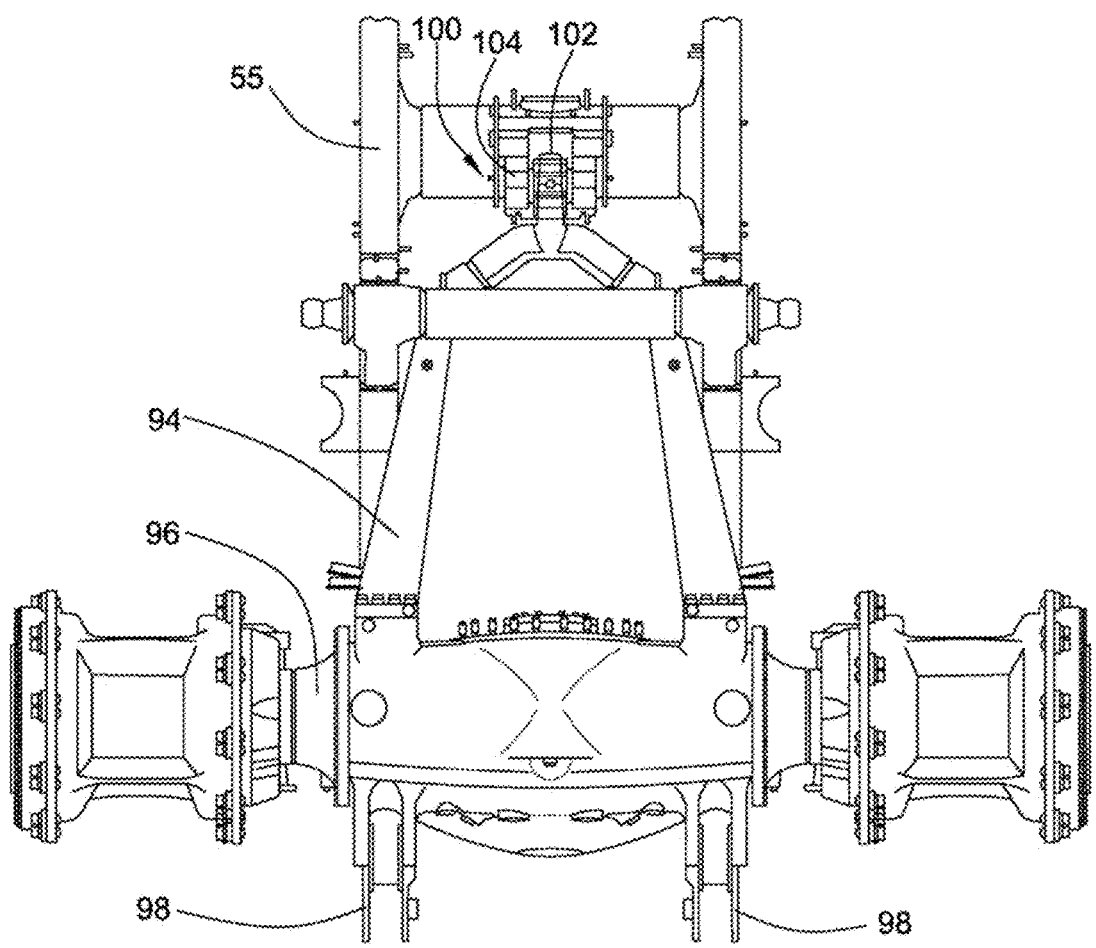
FIG. 2 is a fragmentary, bottom plan view of a chassis of the machine of FIG. 1.

The wheels 80, 81 can be movably connected to the chassis 55 through any suitable means, such as, axles, drive shafts or other components as is well understood in the art. Referring to FIG. 1 and FIG. 2, the rear wheels 81 can be supported by an A-frame 94. The A-frame 94 can include a rear axle 96 that rotatably supports the pair of rear wheels 81 and a pair of suspension mounting brackets 98 adapted to support one end of a suspension system extending between the A-frame 94 and the chassis 55. A joint assembly 100 constructed in accordance with principles of the present disclosure can be provided to pivotably mount a mounting nose 102 of the A-frame 94 to a fork 104 of the chassis 55.

Figure 3:
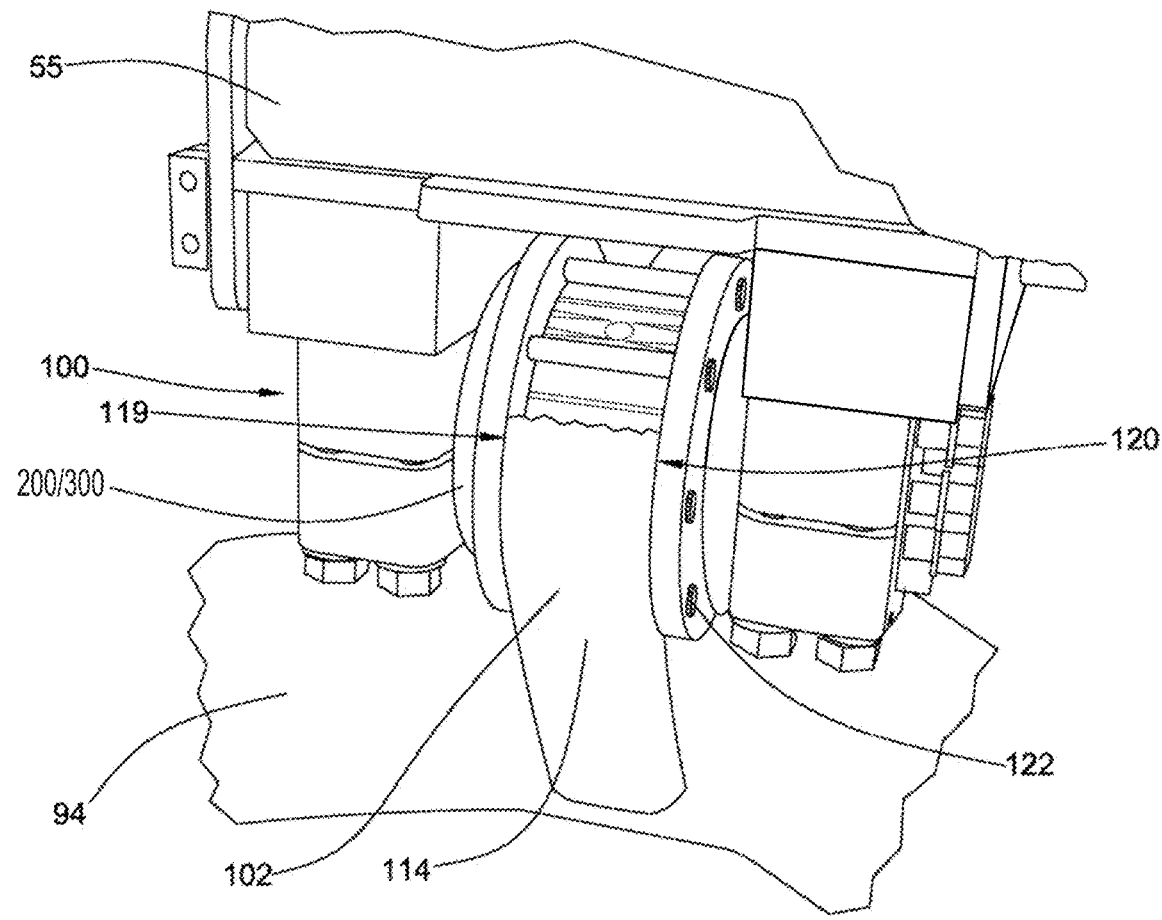
FIG. 3 is an enlarged, fragmentary, perspective view of the joint assembly of FIG. 1.

Referring to FIG. 3, an exemplary embodiment of the joint assembly 100 constructed in accordance with principles of the present disclosure is shown. The joint assembly 100 can include a seal member 200 constructed in accordance with principles of the present disclosure. The joint assembly 100 of FIG. 3 is provided in the machine 50 of FIG. 1 to pivotably mount the mounting nose 102 of the A-frame 94 to the chassis 55 such that the A-frame 94 is pivotably movable with respect to the chassis 55. The A-frame 94 can rotate with respect to the chassis 55 through the movable connection provided by the joint assembly 100. In other embodiments, a joint assembly constructed in accordance with principles of the present disclosure can be used in other machines and can be used in other joint assembly applications. Here, according to one or more embodiments, the joint assembly 100 can allow motion (e.g., rotation, pivoting, or tilting) in multiple planes.

Figure 5:
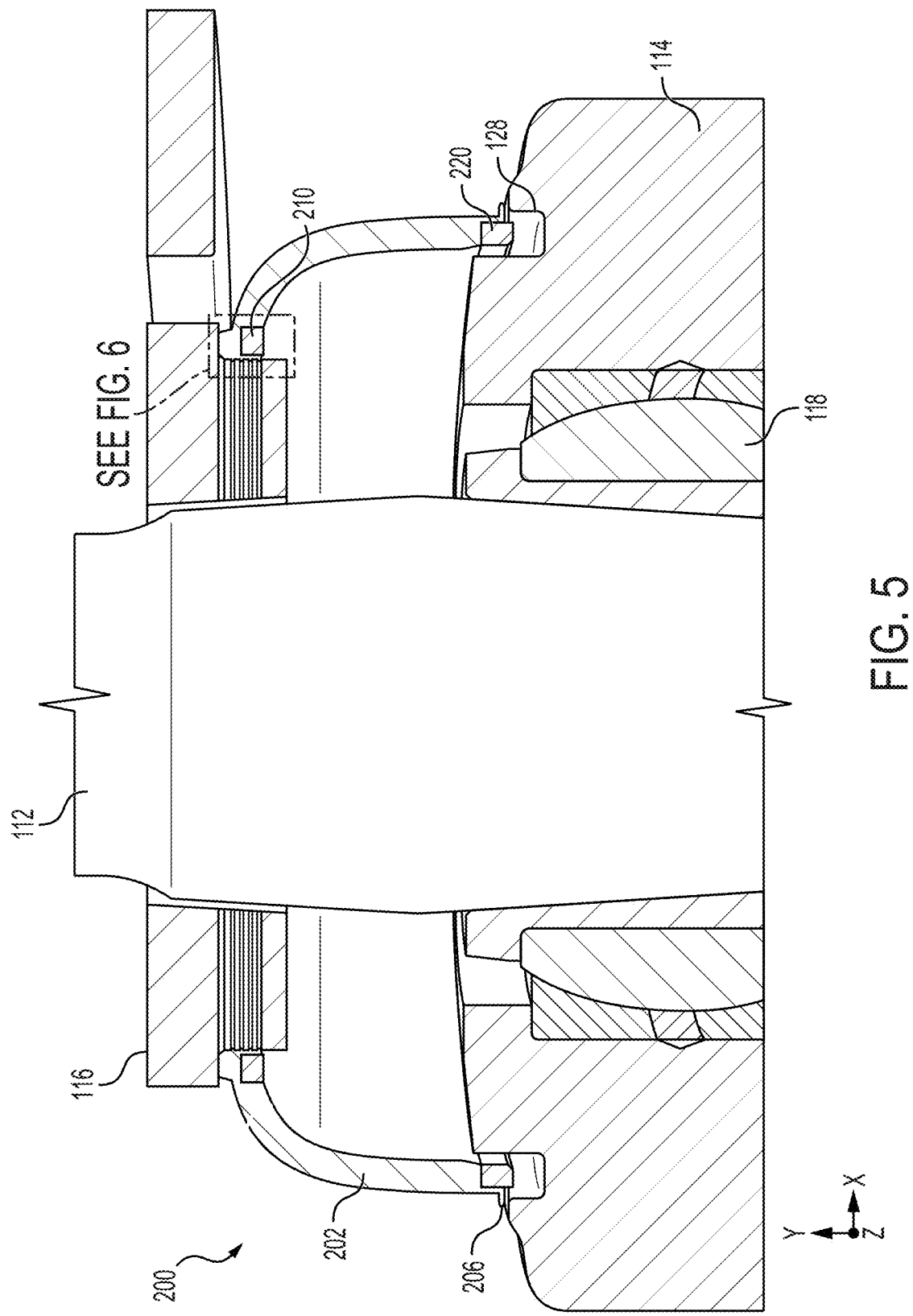
FIG. 5 is a side sectional view of a portion of a joint according to one or more embodiments of the disclosed subject matter.

Still referring to FIG. 3 and also now to FIG. 5, the illustrated joint assembly 100 can include the seal member 200, a shaft 112 (see, e.g., FIG. 5), a pivot member 114 (which can be in the form of the A-frame 94), which may be referred to herein simply as a "pivot," and a bearing 118. The seal member 200 can be connected to a pivot member side 119 of the pivot member 114, which, in this case, can be the A-frame 94 in the illustrated embodiment. Thus, the shaft 112 can be connected to, and can extend from, the fork 104 of the chassis 55 of the machine 50. In other embodiments, the shaft 112 can be mounted to a different component of the machine 50. In embodiments, the shaft 112 can be made from multiple components that can be assembled together from both of the pivot member 114. Further, the shaft 112 can define a rotational axis. The pivot member 114 can rotate with respect to the shaft 112 about the rotational axis. The bearing 118 can be interposed between the shaft 112 and the pivot member 114. In the illustrated embodiment, the bearing 118 is a spherical plain bearing. Further, in embodiments, the bearing 118 can comprise a bearing which can be regarded as a "maintenance-free" bearing inasmuch as lubricant is not applied at the bearing interface, for instance, after installation. Alternatively, the bearing 118 can be a so-called a lubricated bearing (i.e., a non-maintenance-free bearing), whereby the joint is lubricated (e.g., with grease).

As shown in FIG. 5, which is a side sectional view of a portion of a joint assembly 100 according to one or more embodiments of the disclosed subject matter, the seal member 200 can be between a boss 116 and the pivot member 114. Discussed in more detail below, the seal member 200 can be comprised of a body 202, a first ring 210, and a second ring 220. Optionally, the seal member 200 can consist of the body 202, the first ring 210, and the second ring 220.

More specifically regarding the placement of the seal member 200, the seal member 200 can have a first end portion coupled to the boss 116 and a second end portion opposite the first end portion coupled to the pivot member 114. The coupling of the first end portion of the seal member 200 to the boss 116 can form a seal. Thus, the first end portion of the seal member 200 can be regarded as sealingly coupled to the boss 116. Likewise, the coupling of the second end portion of the seal member 200 to the pivot member 114 can form a seal. Thus, the second end portion of the seal member 200 can be regarded as sealingly coupled to the pivot member 114.

Figure 6:
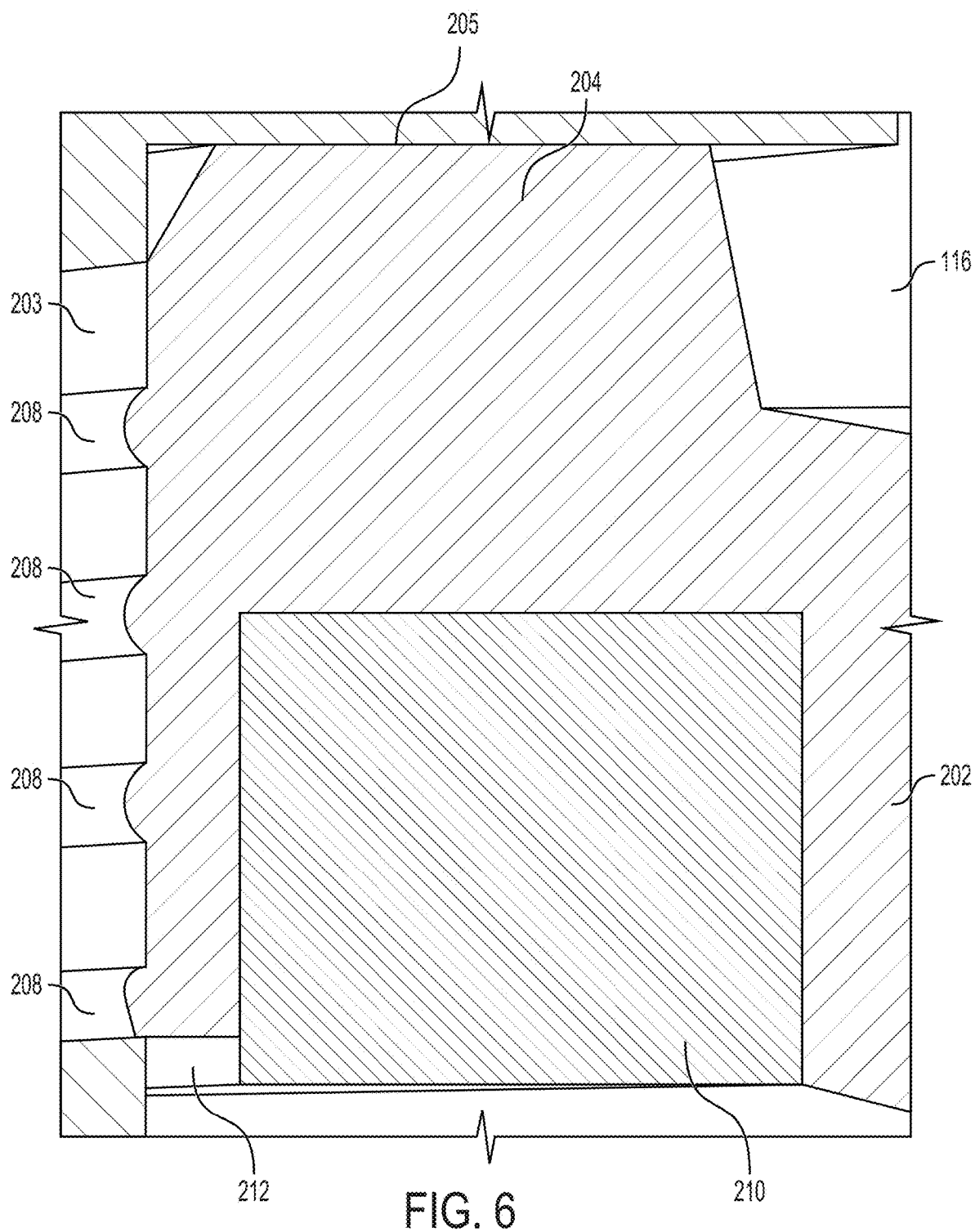
FIG. 6 is an enlarged view of a portion of FIG. 5.
Figure 7:
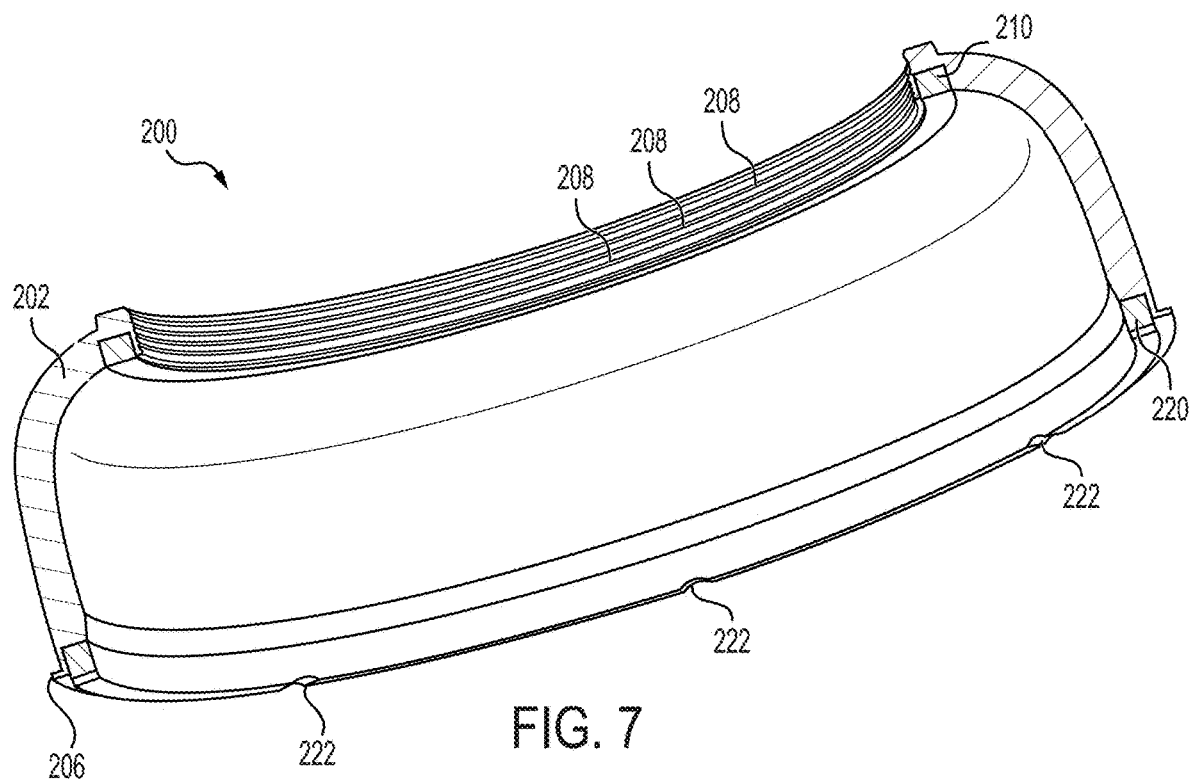
FIG. 7 is a sectional view of a seal according to one or more embodiments of the disclosed subject matter.

The first end portion of the seal member 200 can be press fitted to the boss 116. Such press fit can create the seal between the first end portion of the seal member 200 and the boss 116. More specifically, still referring to FIG. 5 and also now to FIG. 6, which is an enlarged view of a portion of FIG. 5, the body 202 of the seal member 200 can include a neck portion 204 at the first end portion of the seal member 200. Among other features, the neck portion 204 can have a plurality of beads 208 on an inner diameter thereof. The beads 208 may be spaced from each other in a direction parallel to a longitudinal axis of the seal member 200 (or of the shaft 112), such as shown in FIG. 5 and FIG. 6. The beads 208 can also extend around the entirety of the inner diameter of the neck portion 204, for instance, parallel to each other, such as shown in FIG. 7. In addition to creating a seal between the seal member 200 and the boss 116, the beads 208 can also assist in retaining the seal member 200 in place around the corresponding portion of the boss 116.

As shown in FIG. 6 and FIG. 7, the number of beads 208 can be four, though embodiments of the disclosed subject matter are not limited to four beads (could be more or less than four). In the example shown in FIG. 6, the beads 208 can be arranged such that no bead 208 is at the top of inner diameter of the neck portion 204, such that one of the beads 208 is at the bottom of the inner diameter of the neck portion 204, and such that a plurality of beads 208 are between the top and bottom beads 208. It is also noted that the top portion of the neck portion 204 can have an internal chamfer and/or an external chamfer, such as shown in FIG. 6. At least the internal chamfer may be regarded as a lead-in chamfer. According to one or more embodiments, no bead 208 may be at the top of the inner diameter of the neck portion 204 when the top portion of the neck portion 204 has the internal chamfer. Such configuration can aid in assembly of the joint assembly 100. Of course, embodiments of the disclosed subject matter are not limited to the specific configurations and/or placement of the beads 208 as shown in FIG. 6.

The beads 208 can be to directly contact the boss 116, such as shown in FIG. 5, to provide at least a portion of the press-fit seal between the seal member 200 and the boss 116. An upper surface 205 of the neck portion 204 can also contact the boss 116, such as shown in FIG. 6, to form another portion of the press-fit seal between the seal member 200 and the boss 116. According to one or more embodiments, the seal at the inner diameter of the neck portion 204 of the seal member 200 can be regarded as a primary seal at the first end portion of the seal member 200 and the seal at the upper surface 205 of the neck portion 204 can be regarded as a secondary seal between the first end portion of the seal member 200 and the boss 116. Incidentally, the upper surface 205 of the neck portion 204 may define an upper surface of the body 202 and/or the seal member 200. Such upper surface 205 may be referred to herein as a first end of the body 202 and/or the seal member 200.

As shown in FIG. 5, FIG. 6, and FIG. 7, the first ring 210 can be spaced radially outward of the inner diameter of the neck portion 204. Thus, a portion of the neck portion 204 can between the first ring 210 and the boss 116, such as shown in FIG. 5. Further, as shown in FIG. 5, FIG. 6, and FIG. 7, the first ring 210 may extend lower than the bottom of the inner diameter of the neck portion 204. Accordingly, the first ring 210 can define at least a portion of the inner diameter of the seal member 200.

As noted above, the second end portion of the seal member 200 can be press fitted to the pivot member 114. Such press fit can create the seal between the second end portion of the seal member 200 and the pivot member 114. More specifically, referring to FIG. 5, for instance, which shows a partially assembled joint assembly 100, i.e., as the second end portion of the seal member 200 is being coupled to the pivot member 114 (see also FIG. 11 and FIG. 12 for a fully assembled joint assembly 100), the second end portion of the seal member 200 can be provided in a groove or channel 128 in the pivot member 114. The groove 128 in the pivot member 114 can be continuous and can conform to or otherwise accept the shape of the second end portion of the seal member 200.

Among other features, the body 202 of the seal member 200 can have, at the second end portion thereof, a flange 206, such as shown in FIG. 5 and FIG. 7. The flange 206, which can be continuous, can extend around an entire circumference of the body 202. Thus, the flange 206 can be regarded as a circumferential flange. Further, the flange 206 can extend radially outward from the body 202, away from the second ring 220 (and the shaft 112 when assembled). Here, in the embodiment shown in FIG. 5 and FIG. 7, the flange 206 can have a length greater than a width, i.e., the length in the radially outward direction is greater than the thickness thereof, for instance, in a direction parallel to a longitudinal axis of the seal member 200. Thus, the flange 206 may be regarded as long and skinny. In this regard, as discussed in more detail below, the flange 206 can flex upward when the second end portion of the seal member 200 is fitted into the groove 128.

Figure 8:
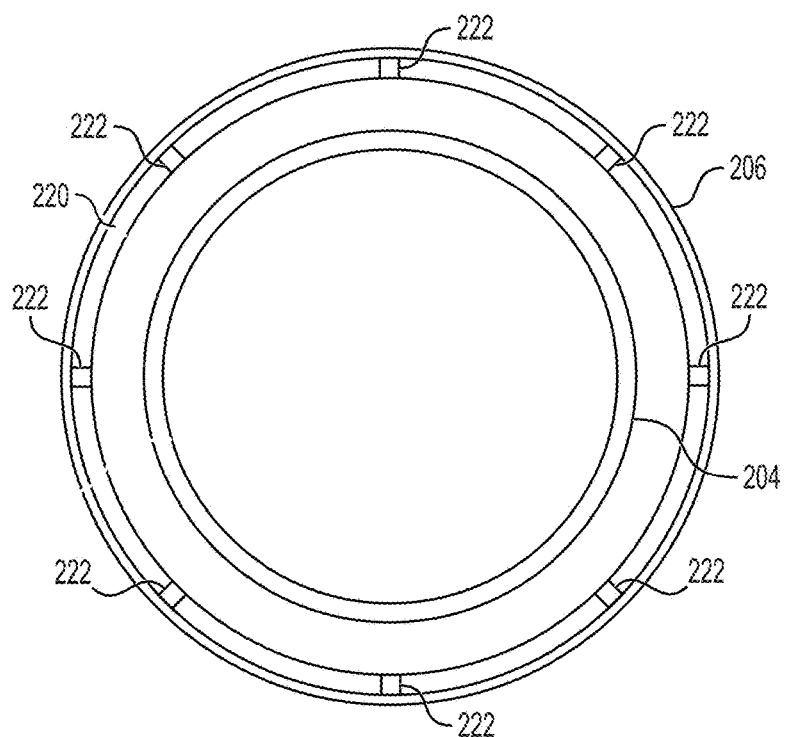
FIG. 8 is an end plan view of the seal of FIG. 7.

Referring now specifically to FIG. 7 and FIG. 8, which show a sectional view of the seal member 200 and an end plan view of the seal member 200 from the second end thereof, respectively, as noted above, the seal member 200 can be comprised of (or can consist of), the body 202, the first ring 210, and the second ring 220. As shown, a first width of the first end portion of the seal member 200 can be less than a second width of the second end portion of the seal member 200. Likewise, the diameter of the first ring 210 can be less than the diameter of the second ring 220. Further, according to one or more embodiments, the sealing member 500 can have a width greater than a height, and the body 202, the first ring 210, and/or the second ring 220 can be circular in an end plan view of the seal member 200, such as shown in FIG. 8. Thus, the seal member 200 may be regarded as bowl-shaped.

The body 202 can define a first opening of the seal member 200. Such first opening can be to receive a portion of the boss 116 to create a seal between the first end portion of the seal member 200 and the boss 116, as discussed above. The first opening can also accommodate the shaft 112, which can also extend through an opening in the boss 116. The first ring 210 may also be regarded as forming some or all of the first opening.

The body 202 can also define a second opening of the seal member 200. Such second opening can be sized based on the size of the groove 128 so the second end portion of the seal member 200 can be fitted into the groove 128, as discussed above. The second opening can also accommodate the shaft 112 and optionally a portion of the bearing 118. The second ring 220 can also be regarded as forming some or all of the second opening of the seal member 200.

The second ring 220, according to one or more embodiments of the disclosed subject matter, can have one or more openings, grooves, or channels 222 at an end thereof. The grooves 222 can extend radially from an inner diameter of the second ring 220 to an outer diameter of the second ring 200. In the case of multiple grooves 222, the grooves can be spaced from each other circumferentially around the circumference of the second ring 220, for instance, evenly around the circumference. For instance, pairs of grooves 222 can be offset from each other by 180 degrees. The embodiment shown in FIG. 8 shows eight grooves 222, though embodiments of the disclosed subject matter are not so limited. The grooves 222 can provide pressure relief for lubricant (e.g., grease) within the seal member 200 due to relatively high pressure that may be caused by operation of the joint assembly 100. Thus, the grooves 222 may be regarded as pressure relief grooves. In this regard, the grooves 222 can allow lubricant to pass from inside the joint assembly to outside the joint assembly due to the relatively high pressure caused by operation of the joint assembly 100.

Figure 11:
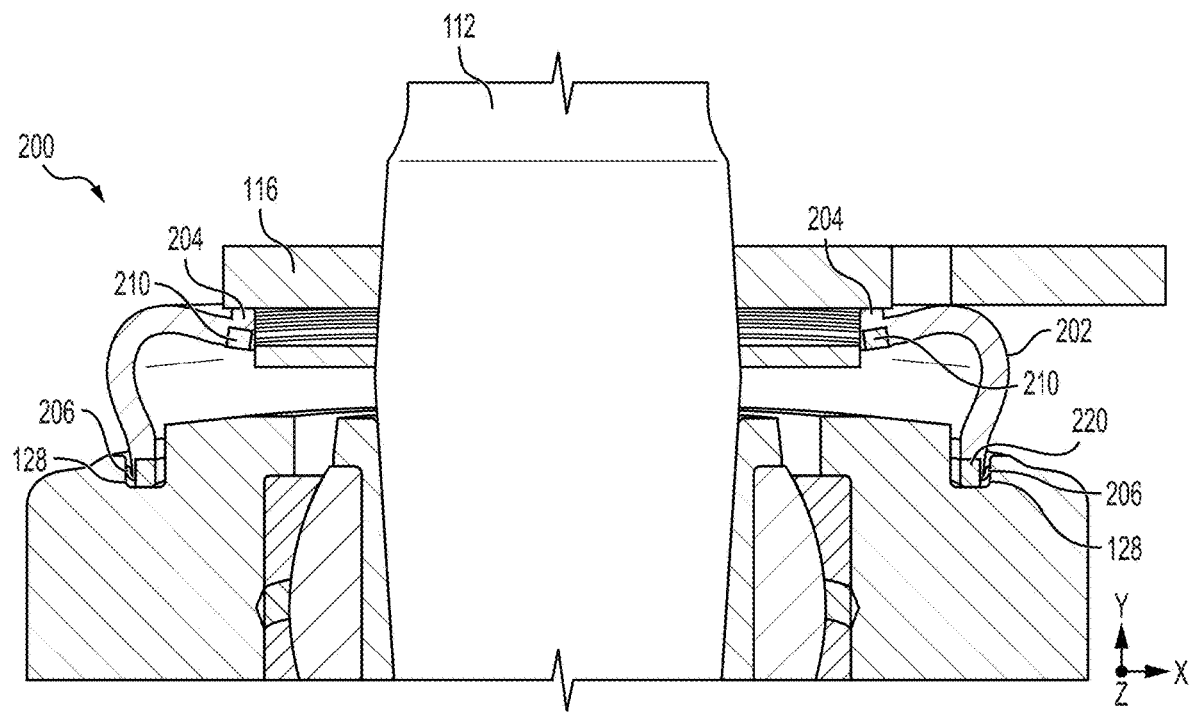
FIG. 11 and FIG. 12 show assembled and operational states of the joint of FIG. 5, respectively.
Figure 12:
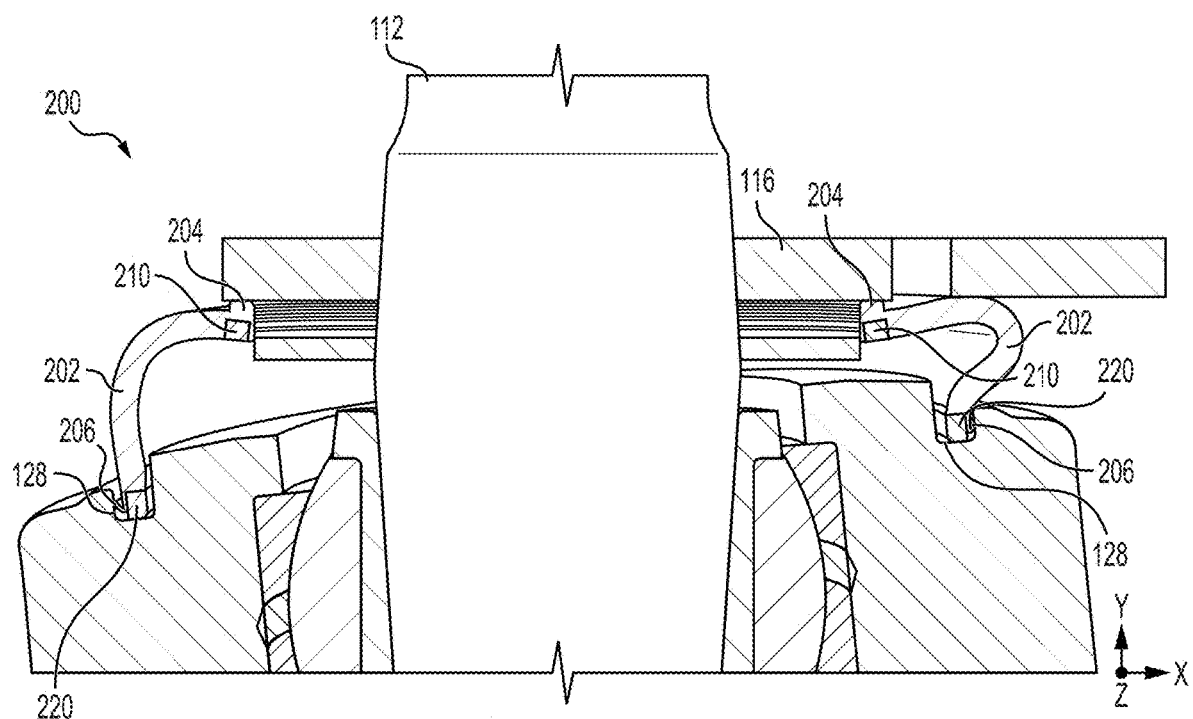

The flange 206 can also provide pressure relief for lubricant due to relatively high pressure that may be caused by operation of the joint assembly 100. Here, the relatively high pressure may be greater than the pressure that causes the lubricant to be expelled from the grooves 222. For instance, with the second end portion of the seal member 200 fully fitted into the groove 128, such as shown in FIG. 11 and FIG. 12, the flange 206 can be bent upward in the groove 128. Here, the flange 206, when bent, can contact a sidewall of the groove 128 but may not contact the floor of the groove 128. Rather, the end of the second ring 220 having the grooves 222 can contact the floor of the groove 128. Hence, the end surface of the second ring 220 may define the second end of the seal member 200, with the flange 206 being offset (e.g., 2 mm) toward the first end portion of the seal member 200 relative to the end surface of the second ring 220. Otherwise, the material of the body 202 may flow into and plug the grooves 222 during molding.

Lubricant can flow through the grooves 222 and to the bent flange 206. The relatively high pressure, when high enough to "break" the seal created by the bent flange 206, can cause the flange 206 to further distort or deflect and allow passage of the lubricant to outside the seal member 200. For instance, application of lubricant (e.g., grease) to the joint, for instance, when in cold weather conditions where the lubricant may be more viscous, can cause increased internal pressure and hence lubricant to be expelled via one or more of the grooves 222. Movement of the joint assembly 100 from the position shown in FIG. 11 to the position shown in FIG. 12 may also cause lubricant to be expelled from one or more of the grooves 222, for instance, from the left-hand side of the joint assembly 100 due to reduction in normal contact pressure of the second ring 220.

The body 202 can be made of a semi-flexible and semi-rigid material, such as rubber. The first ring 210 and the second ring 220 can be formed of a material more rigid that the material of the body 202. For instance, the material of the first ring 210 can be nylon or steel and the material of the second ring 220 can be steel. In the case of the first ring 210, the material and construction can be to provide stiffness to retain the seal member 200 in place (around the portion of the boss 116). In the case of the second ring 210, the material and construction can be to provide stiffness and locate/guide the second end portion into the groove 128. Optionally, the body 202 may taper from thick to thin at the interface with the second ring 220, such as shown in FIG. 7. Such tapering may be for ease of assembly.

The first ring 210 can be fitted to the neck portion 204 at the first end portion of the body 202. Likewise, the second ring 220 can be fitted to the body 202 at the second end portion of the body. Here, according to one or more embodiments, each of the first ring 210 and the second ring 220 can be mold-fitted to the body 202. That is, the body 202 can be molded onto the first ring 210 and/or the second ring 220, according to embodiments of the disclosed subject matter.

Figure 9:
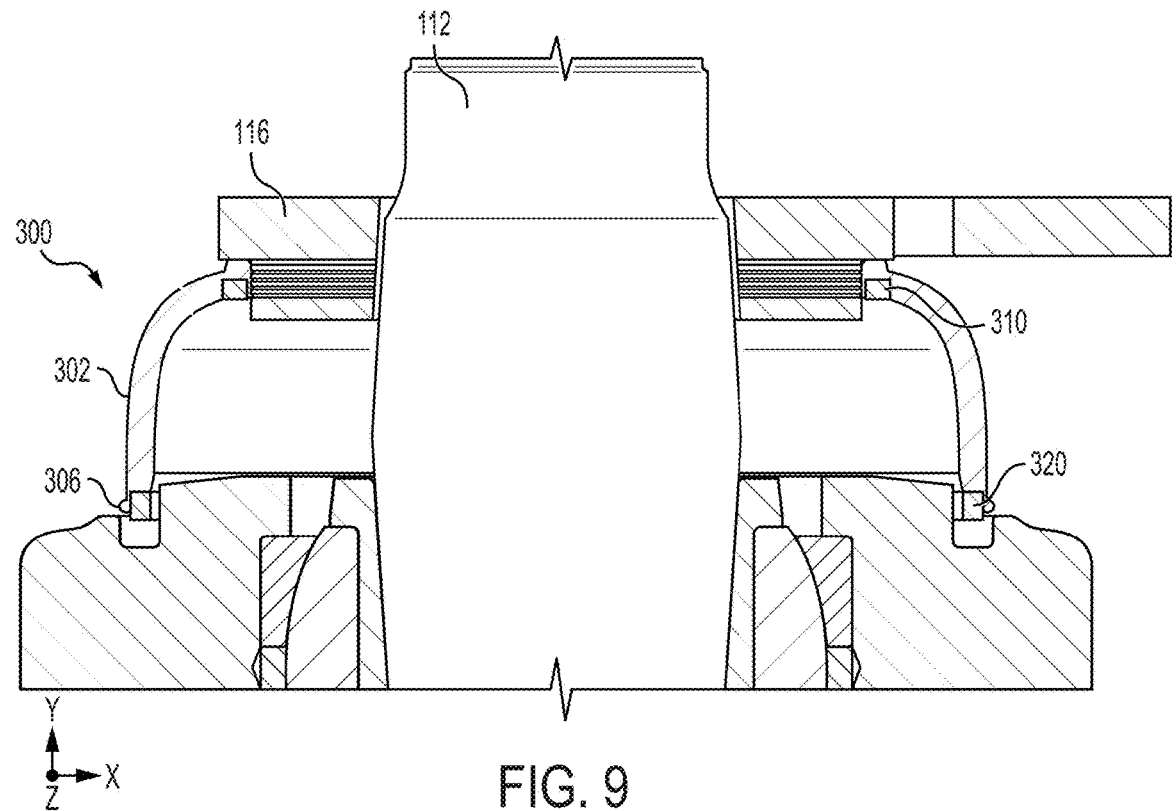
FIG. 9 is a side sectional view of a portion of a joint according to one or more other embodiments of the disclosed subject matter.
Figure 10:
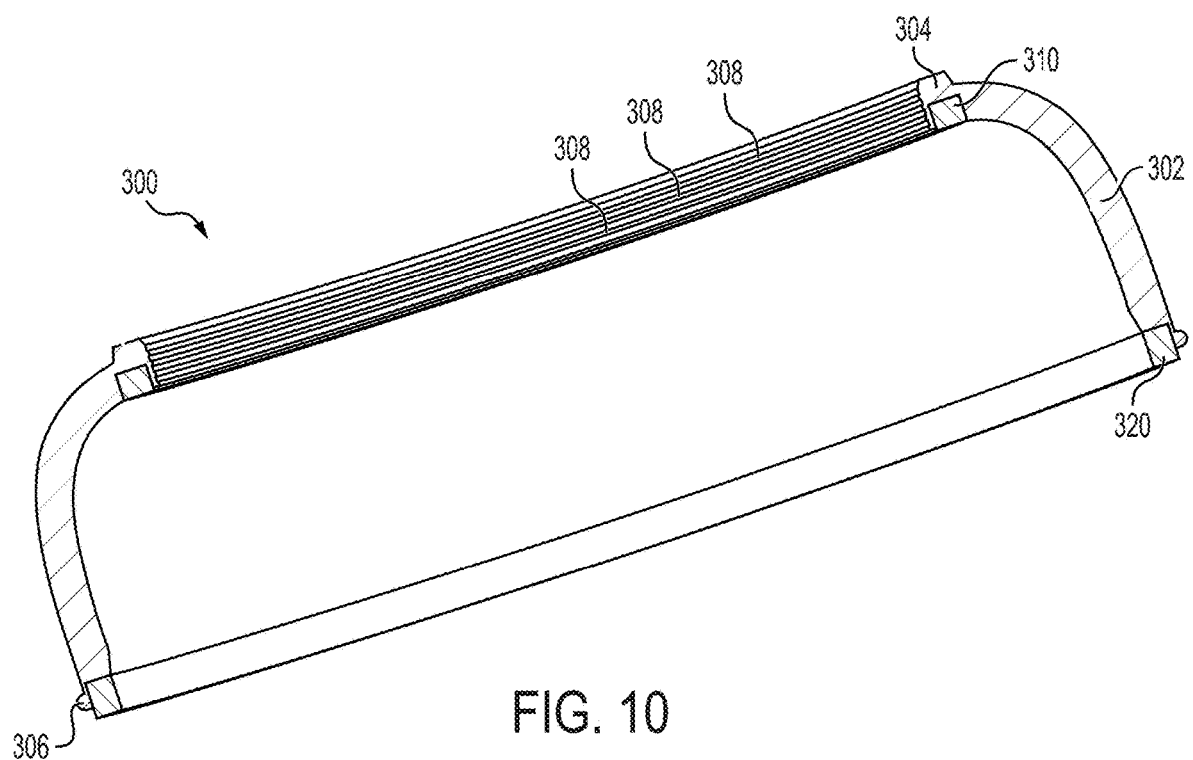
FIG. 10 is a sectional view of a seal according to one or more other embodiments of the disclosed subject matter.

Turning now to FIG. 9 and FIG. 10, these figures show a seal member 300 according to another embodiment of the present disclosure. Whereas the seal member 200 can be directed to a lubricated bearing joint, the seal member 300 can be directed to a non-lubricated bearing joint, also known as a maintenance free bearing joint.

The seal member 300 can be comprised of a body 302, a first ring 310, and a second ring 320. According to one or more embodiments, the seal member 300 can consist of the body 302, the first ring 310, and the second ring 320. Notably, the end of the second ring 320 does not include any openings, ports, or vents (e.g., 222 discussed above). Rather, the end surface of the second ring 320 can be without or free of one or more pressure relief grooves and may be completely flat.

Figure 13:
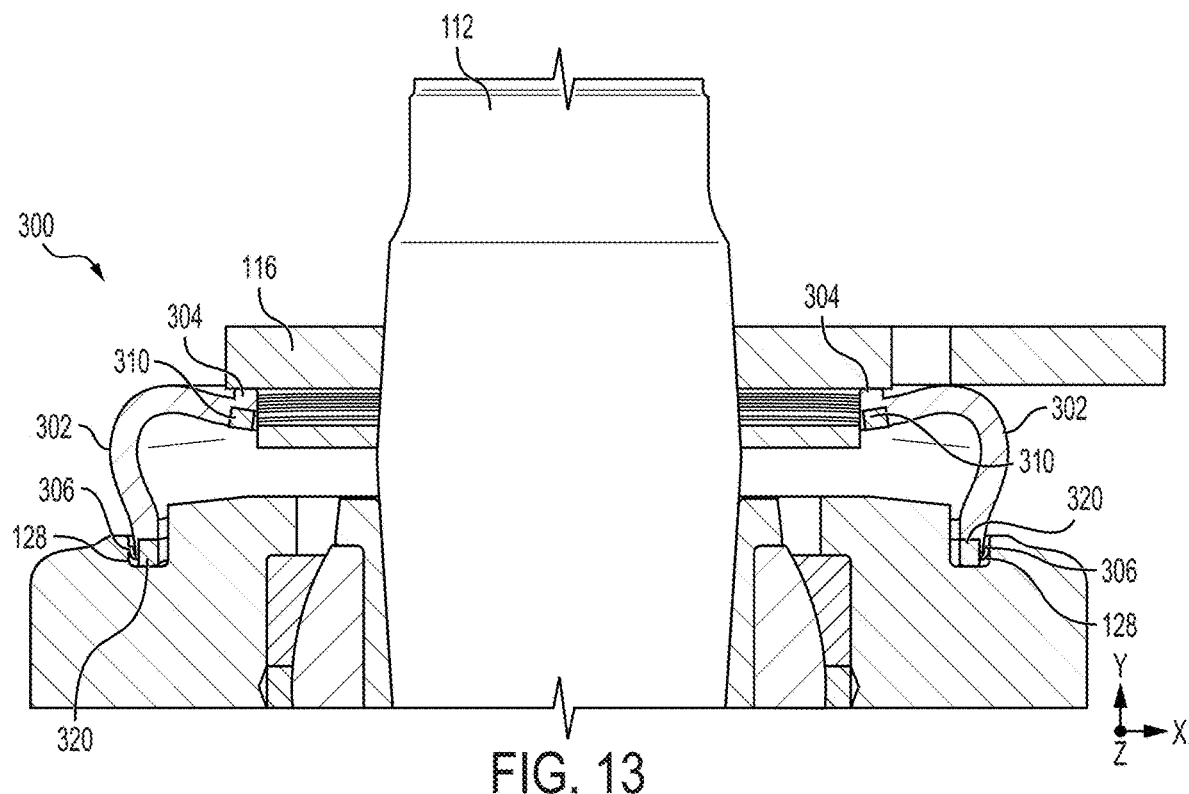
FIG. 13 and FIG. 14 show assembled and operational states of the joint of FIG. 9, respectively.
Figure 14:
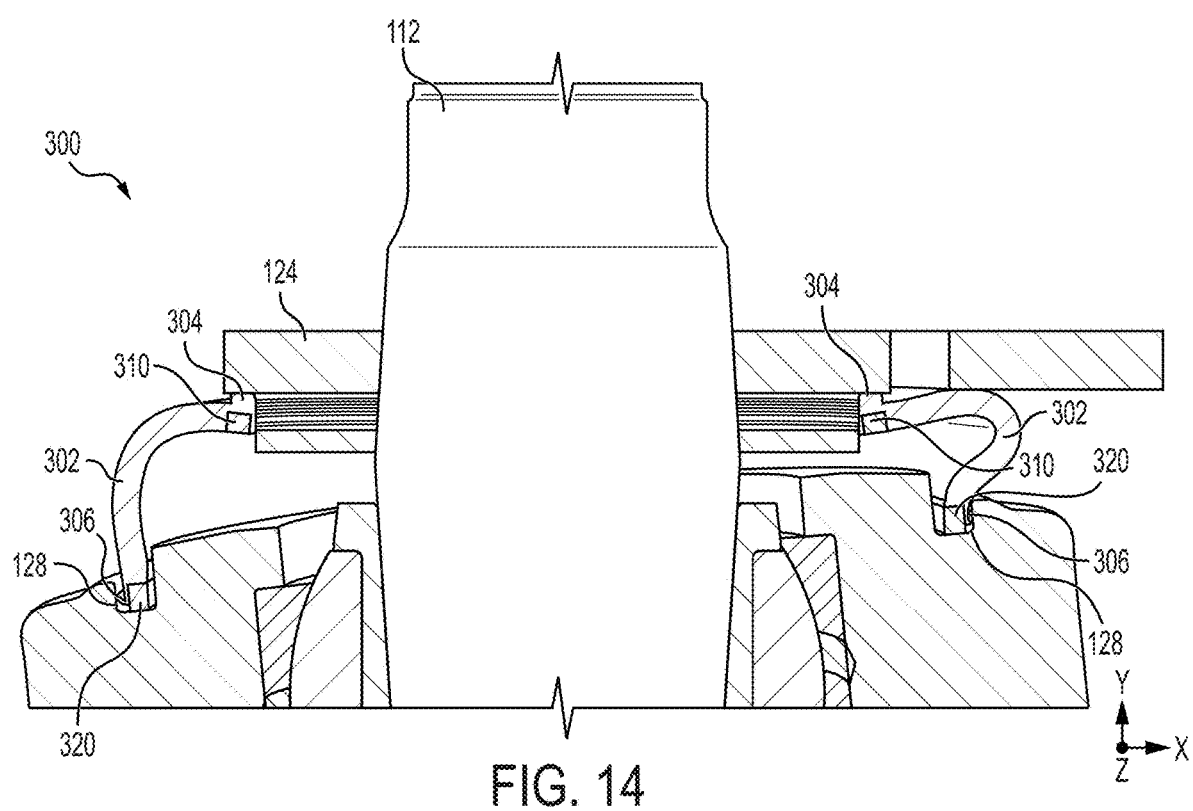

The body 302 can also include a flange 306. Here, the flange 306 can have a thickness in a direction parallel to a longitudinal axis of the seal member 300 that is greater than or equal to a length of the flange 306 in the radially outward direction, away from the second ring 320. Thus, the flange 306 may be regarded as short and thick. When inserted into the groove 128 of the pivot member 114, the flange 306 may not deflect upward. Rather, the end of the flange 306 may abut the sidewall of the groove 128, such as shown in FIG. 13 and FIG. 14. Further, the flange 306 may not contact the floor of the groove 128, also shown in FIG. 13 and FIG. 14. The relatively thick flange 306 abutting the sidewall of the groove 128 can create a reliable seal between the body 302 and the pivot member 114, for instance, since no pressure relief is needed. The reliable seal created by the flange 306 can also prevent debris (e.g., dirt) from entering inside the joint assembly 100.

INDUSTRIAL APPLICABILITY

As noted above, the present disclosure relates to a seal member for a joint assembly of a machine and, systems, methods, and assemblies thereof. One or more embodiments of the disclosed subject matter can be for a lubricated bearing (i.e., a non-maintenance-free bearing) of a joint assembly of a machine, and one or more embodiments of the disclosed subject matter can be for a maintenance-free bearing of a joint assembly of a machine. Here, the joint assembly and/or the machine can be the same for various embodiments of the seal member, whether the bearing is lubricated or not. According to embodiments of the disclosed subject matter, the joint can be a so-called A-frame joint of an off-highway truck (OHT) or an articulated dump truck (ADT).

Regarding assembly and operation, a seal member, such as seal member 200 or seal member 300, can be provided. The body 202/302 of the seal member 200/300 can be molded onto the first ring 210/310 and/or the second ring 220/320. Alternatively, the first ring 210/310 and/or the second ring 220/320 can be affixed to the body 202/302 via an adhesive, for instance.

According to one or more embodiments, the seal member 200/300 may be provided preassembled on the boss 116, such as shown in FIG. 5 and FIG. 9. Here, the beads 208/308 can be press fitted onto a portion of the boss 116, such as shown in FIG. 5 and FIG. 9, which can help to retain the seal member 200/300 in place. The first ring 210/310 can help to provide stiffness and retain the seal member 200/300 in place.

Transitioning from FIG. 5 to FIG. 11 for seal member 200 and from FIG. 9 to FIG. 13 for seal member 300, the seal member 200/300, already connected to the boss 116, can self-locate and self-seal into the groove 128 of the pivot member 114, for instance, due to the thickness, rigidity, and/or stiffness of the seal member 200/300 (including based on at least the second rings 220/320). That is, the A-frame head can be simply offered up to the seal member 200/300 connected to the boss 116, and the thickness and semi-rigidity of the body 202/302 can push the second end portion of the seal member 200/300 into the groove 128, such as shown in FIG. 11 and FIG. 13. When installed, the end surface of the second ring 210/310 can abut the floor of the groove 128. In the case of FIG. 11, the flange 206 can be bent away from the second end of the seal member 200, against the sidewall defining the groove 128 in the pivot member 114 and may not contact the floor defining the groove 128 in the pivot member 114. And in the case of FIG. 13, the end of the flange 306 can abut the sidewall defining the groove 128 in the pivot member 114 without the flange 306 touching the floor defining the groove 128 in the pivot member 114.

Operation of the joint assembly 100 can involve rotation or pivoting of the joint. For instance, the joint assembly 100 can move from the position shown in FIG. 11 to the position shown in FIG. 12 or from the position shown in FIG. 13 to the position shown in FIG. 14, depending upon the type of joint, i.e., a lubricated joint or a maintenance-free joint. As shown in FIGS. 11-14, the body 202/302 can be flexible. When the seal member 200/300 goes through different machine motions it can have max compression on one location and least compression on the opposite end. In the case of the joint assembly 100 using the seal member 200, lubricant can flow through the grooves 222 and to the bent flange 206. The relatively high pressure, when high enough to "break" the seal created by the bent flange 206, can cause the flange 206 to further distort and allow passage of the lubricant to outside the seal member 200. For instance, as noted above, application of lubricant (e.g., grease) to the joint, for instance, when in cold weather conditions where the lubricant may be more viscous, can cause increased internal pressure and hence lubricant to be expelled via one or more of the grooves 222. Movement of the joint assembly 100 from the position shown in FIG. 11 to the position shown in FIG. 12 may also cause lubricant to be expelled from one or more of the grooves 222, for instance, from the left-hand side of the joint assembly 100 due to reduction in normal contact pressure of the second ring 220.

Embodiments of the disclosed subject matter can also be as set forth according to the following parentheticals.

(1) A joint assembly for a machine, the joint assembly comprising: a shaft defining a rotational axis; a bearing coupled to the shaft such that the bearing is pivotable about the rotation axis with the shaft; a pivot mounted to the bearing such that the pivot is pivotable about the rotational axis with respect to the shaft; a boss; and a seal having a first end portion sealingly coupled to the boss and a second end portion opposite the first end portion sealingly coupled to the pivot, wherein the seal includes: a semi-rigid rubber body defining a first opening at the first end portion of the seal and a second opening at the second end portion of the seal, a first ring mold-fitted to the semi-rigid rubber body at the first end portion of the seal, the second ring being made of steel or nylon, and a second ring mold-fitted to the semi-rigid rubber body at the second end portion of the seal, the second ring being made of steel, wherein a first diameter of the first ring is less than a second diameter of the second ring, wherein the semi-rigid rubber body has a circumferential flange extending radially outward, away from the shaft, at an end thereof associated with the second end portion of the seal.

(2) The joint assembly of (1), wherein the first end portion of the seal is sealingly coupled to the boss via press fit, and wherein the second end portion of the seal is sealingly coupled to the pivot via press fit into a continuous groove in the pivot.

(3) The joint assembly of (1) or (2), wherein a neck portion of semi-rigid rubber body at the first end portion of the seal has a plurality of beads on an inner diameter thereof to directly contact the boss for at least a portion of the press fit of the seal to the boss, and wherein the plurality of beads are spaced from each other in a direction parallel to a longitudinal axis of the shaft.

(4) The joint assembly of any one of (1) to (3), wherein the first ring is spaced radially outward from the inner diameter of the neck portion of semi-rigid rubber body.

(5) The joint assembly of any one of (1) to (4), wherein an end surface of the second ring at a second end of the seal associated with the second end portion of the seal has a plurality of pressure relief grooves circumferentially spaced thereabout.

(6) The joint assembly of any one of (1) to (5), wherein the circumferential flange has a length in the radially outward direction greater than a thickness in a direction parallel to a longitudinal axis of the shaft.

(7) The joint assembly of any one of (1) to (6), wherein an end surface of the second ring at a second end of the seal associated with the second end portion of the seal is completely flat and without one or more pressure relief grooves.

(8) The joint assembly of any one of (1) to (7), wherein the circumferential flange has a thickness in a direction parallel to a longitudinal axis of the shaft greater than or equal to a length in the radially outward direction.

(9) A method comprising: providing a seal having a first end portion to be sealingly coupled to a boss of a joint assembly and a second end portion opposite the first end portion to be sealingly coupled to a pivot of the joint assembly, wherein the seal includes: a rubber body defining a first opening at the first end portion of the seal and a second opening at the second end portion of the seal, a first ring fixed to the rubber body at the first end portion of the seal, the first ring being made of material more rigid than a rubber of the rubber body, a second ring fixed to the rubber body at the second end portion of the seal, the second ring being made of material more rigid than the rubber of the rubber body, wherein a first width of the first end portion of the seal is less than a second width of the second end portion of the seal, wherein the rubber body has a flange extending radially outward, away from a central longitudinal axis of the seal, at a second end of the rubber body associated with the second end portion of the seal.

(10) The method according to (9), further comprising installing the seal in the joint assembly such that the first end portion of the seal press fit to the boss and such that the second end portion of the seal is press fit into a groove in the pivot.

(11) The method according to (9) or (10), wherein an end surface of the second ring at a second end of the seal has a plurality of pressure relief grooves, and wherein the method further comprises allowing lubrication to be expelled from some or all of the plurality of pressure relief grooves responsive to pivotal movement of the shaft.

(12) The method according to any one of (9) to (11), wherein the flange has a length in the radially outward direction greater than a thickness in a direction parallel to a longitudinal axis of the shaft, and wherein said installing the seal in the joint assembly is such that an end surface of the second ring at the second end of the seal abuts a floor defining the groove in the pivot, and such that the flange is bent away from the second end of the seal, against a sidewall defining the groove in the pivot, and does not contact the floor defining the groove in the pivot.

(13) The method according to any one of (9) to (12), wherein the circumferential flange has a thickness in a direction parallel to a longitudinal axis of the shaft greater than or equal to a length in the radially outward direction, and wherein said installing the seal in the joint assembly is such that that an end surface of the second ring at the second end of the seal abuts a floor defining the groove in the pivot, and such that a sidewall of the flange abuts a sidewall defining the groove in the pivot without the flange touching the floor defining the groove in the pivot.

(14) A sealing member having a first end portion and a second end portion opposite the first end portion, the sealing member comprising: a semi-flexible body defining a first opening at the first end portion of the seal and a second opening at the second end portion of the sealing member; a first ring fitted to the semi-flexible body at the first end portion of the sealing member, the first ring being made of material more rigid than material of the semi-flexible body; and a second ring fixed to the semi-flexible body at the second end portion of the sealing member, the second ring being made of material more rigid than the material of the semi-flexible body, wherein a first diameter of the first ring is less than a second diameter of the second ring, and wherein the semi-flexible body has a flange that extends radially outward, away from a central longitudinal axis of the sealing member, at a second end of the semi-flexible body associated with the second end portion of the sealing member.

(15) The sealing member according to (14), wherein the semi-flexible body is made of rubber, wherein the first ring is made of steel or nylon, and wherein the second ring is made of steel.

(16) The sealing member according to (14) or (15), wherein an end surface of the second ring at the second end portion of the sealing member has a plurality of grooves each extending radially from an inner diameter of the second ring to an outer diameter of the second ring, and wherein the flange has a length in the radially outward direction greater than a thickness of the flange in a direction parallel to a longitudinal axis of the sealing member.

(17) The sealing member according to any one of (14) to (16), wherein an end surface of the second ring at a second end portion of the sealing member is completely flat and free of any pressure relief grooves, and wherein the flange has a thickness in a direction parallel to a longitudinal axis of the sealing member greater than or equal to a length of the flange in the radially outward direction.

(18) The sealing member according to any one of (14) to (17), wherein each of the semi-flexible body, the first ring, and the second ring is circular in an end plan view of the sealing member.

(19) The sealing member according to any one of (14) to (18), wherein the sealing member has a width thereof greater than a height.

(20) The sealing member according to any one of (14) to (19), wherein a neck portion of semi-flexible body at the first end portion of the sealing member has a plurality of beads on an inner diameter thereof, and wherein the plurality of beads are spaced from each other in a direction parallel to a longitudinal axis of the sealing member.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A joint assembly for a machine, the joint assembly comprising:
   a shaft defining a rotational axis;
   a bearing coupled to the shaft such that the bearing is pivotable about the rotational axis with the shaft;
   a pivot mounted to the bearing such that the pivot is pivotable about the rotational axis with respect to the shaft;
   a boss; and
   a seal having a first end portion sealingly coupled to the boss and a second end portion opposite the first end portion sealingly coupled to the pivot,
   wherein the seal includes:
      a semi-rigid rubber body defining a first opening at the first end portion of the seal and a second opening at the second end portion of the seal,
      a first ring mold-fitted to the semi-rigid rubber body at the first end portion of the seal, the first ring being made of steel or nylon, and
      a second ring mold-fitted to the semi-rigid rubber body at the second end portion of the seal, the second ring being made of steel,
   wherein a first diameter of the first ring is less than a second diameter of the second ring,
   wherein the semi-rigid rubber body has a circumferential flange extending radially outward, away from the shaft, at an end thereof associated with the second end portion of the seal,
   wherein the second ring has a bottom end surface and a radially inward facing side surface perpendicular to each other,
   wherein each of the bottom end surface and the radially inward facing side surface is exposed from the semi-rigid rubber body such that the semi-rigid rubber body does not cover any portion of the bottom end surface and any portion of the radially inward facing side surface,
   wherein the radially inward facing side surface of the second ring faces a longitudinal axis of the shaft, and
   wherein the bottom end surface of the second ring forms a bottom most portion of the seal.

2. The joint assembly of claim 1,
   wherein the first end portion of the seal is sealingly coupled to the boss via press fit, and
   wherein the second end portion of the seal is sealingly coupled to the pivot via press fit into a continuous groove in the pivot.

3. The joint assembly of claim 2,
   wherein a neck portion of semi-rigid rubber body at the first end portion of the seal has a plurality of beads on an inner diameter thereof to directly contact the boss for at least a portion of the press fit of the seal to the boss, and
   wherein the plurality of beads are spaced from each other in a direction parallel to a longitudinal axis of the shaft.

4. The joint assembly of claim 3,
   wherein the first ring is spaced radially outward from the inner diameter of the neck portion of semi-rigid rubber body, and
   wherein a top end surface of first ring is entirely covered by the semi-rigid rubber body such that no portion of the top end surface of first ring is exposed.

5. The joint assembly of claim 1, wherein the bottom end surface of the second ring is entirely below the circumferential flange in a direction parallel to the longitudinal axis of the shaft.

6. The joint assembly of claim 1, wherein the circumferential flange has a length in the radially outward direction greater than a thickness in a direction parallel to a longitudinal axis of the shaft.

7. The joint assembly of claim 1,
   wherein the bottom end surface of the second ring at a second end of the seal associated with the second end portion of the seal is completely flat and without one or more pressure relief grooves, and
   wherein the second ring extends below the circumferential flange in a direction parallel to a longitudinal axis of the shaft.

8. The joint assembly of claim 1, wherein the circumferential flange has a thickness in a direction parallel to a longitudinal axis of the shaft greater than or equal to a length in the radially outward direction.

9. A method comprising:
providing a seal having a first end portion to be sealingly coupled to a boss of a joint assembly and a second end portion opposite the first end portion to be sealingly coupled to a pivot of the joint assembly,
wherein the seal includes:
a rubber body defining a first opening at the first end portion of the seal and a second opening at the second end portion of the seal,
a first ring fixed to the rubber body at the first end portion of the seal, the first ring being made of material more rigid than a rubber of the rubber body, and
a second ring fixed to the rubber body at the second end portion of the seal, the second ring being made of material more rigid than the rubber of the rubber body,
wherein a first width of the first end portion of the seal is less than a second width of the second end portion of the seal,
wherein the rubber body has a flange extending radially outward, away from a central longitudinal axis of the seal, at a second end of the rubber body associated with the second end portion of the seal,
wherein the second ring has a bottom end surface and a radially inward facing side surface perpendicular to each other,
wherein each of the bottom end surface and the radially inward facing side surface of the second ring is exposed from the rubber body such that the rubber body does not cover any portion of the bottom end surface and any portion of the radially inward facing side surface, and
wherein the bottom end surface of the second ring forms a bottom most portion of the seal.

10. The method according to claim 9, further comprising installing the seal in the joint assembly such that the first end portion of the seal is press fit to the boss and such that the second end portion of the seal is press fit into a groove in the pivot, the second end portion of the seal being press fit into the groove such that the bottom end surface of the second ring directly contacts a floor defining the groove and such that no portion of a bottom surface of the flange contacts the floor of the groove.

11. The method according to claim 10,
wherein the bottom end surface of the second ring at a second end of the seal has a plurality of pressure relief grooves, and
wherein the method further comprises allowing lubrication to be expelled from some or all of the plurality of pressure relief grooves responsive to pivotal movement of the shaft.

12. The method according to claim 10,
wherein the flange has a length in the radially outward direction greater than a thickness in a direction parallel to a longitudinal axis of the shaft, and
wherein said installing the seal in the joint assembly is such that the flange is bent away from a second end of the seal, a bottom surface of the flange is against a sidewall defining the groove in the pivot, and no portion of the flange contacts the floor defining the groove in the pivot.

13. The method according to claim 10,
wherein the circumferential flange has a thickness in a direction parallel to a longitudinal axis of the shaft greater than or equal to a length in the radially outward direction, and
wherein said installing the seal in the joint assembly is such that that a sidewall of the flange abuts a sidewall defining the groove in the pivot without the flange touching the floor defining the groove in the pivot.

14. A sealing member having a first end portion and a second end portion opposite the first end portion, the sealing member comprising: a semi-flexible body defining a first opening at the first end portion of the sealing member and a second opening at the second end portion of the sealing member; a first ring fitted to the semi-flexible body at the first end portion of the sealing member, the first ring being made of material more rigid than material of the semi-flexible body; and a second ring fitted to the semi-flexible body at the second end portion of the sealing member, the second ring being made of material more rigid than material of the semi-flexible body, wherein a first diameter of the first ring is less than a second diameter of the second ring, wherein the semi-flexible body has a flange that extends radially outward, away from a central longitudinal axis of the sealing member, at a second end of the semi-flexible body associated with the second end portion of the sealing member, wherein the second ring has a bottom end surface and a radially inward facing side surface perpendicular to each other, an upper end surface opposite the bottom end surface, and a radially outward facing surface opposite the radially inward facing surface, wherein the upper end surface of the second ring is covered by the semi-flexible body, no portions of the bottom end surface and the radially inward facing surface are covered by the semi-flexible body, and a bottom portion of the radially outward facing surface is not covered by the semi-flexible body, and wherein the bottom end surface of the second ring forms a bottom most portion of the sealing member,
wherein the radially inward facing side surface of the second ring faces a longitudinal axis of the shaft, and
wherein the bottom end surface of the second ring forms a bottom most portion of the seal.

15. The sealing member according to claim 14,
wherein the semi-flexible body is made of rubber,
wherein the first ring is made of steel or nylon, and
wherein the second ring is made of steel.

16. The sealing member according to claim 14,
wherein the bottom end surface of the second ring at the second end portion of the sealing member has a plurality of grooves each extending radially from an inner diameter of the second ring to an outer diameter of the second ring, and
wherein the flange has a length in the radially outward direction greater than a thickness of the flange in a direction parallel to the central longitudinal axis of the sealing member.

17. The sealing member according to claim 14,
wherein the bottom end surface of the second ring at the second end portion of the sealing member is completely flat and free of any pressure relief grooves, and
wherein the flange has a thickness in a direction parallel to the central longitudinal axis of the sealing member greater than or equal to a length of the flange in the radially outward direction.

18. The sealing member according to claim 14, wherein each of the semi-flexible body, the first ring, and the second ring is circular in an end plan view of the sealing member.

19. The sealing member according to claim 14, wherein the sealing member has a width thereof greater than a height.

20. The sealing member according to claim 14,
wherein a neck portion of semi-flexible body at the first end portion of the sealing member has a plurality of beads on an inner diameter thereof, and
wherein the plurality of beads are spaced from each other in a direction parallel to a longitudinal axis of the sealing member.

\* \* \* \* \*